(12) United States Patent
He et al.

(10) Patent No.: US 9,106,760 B2
(45) Date of Patent: Aug. 11, 2015

(54) RECORDING SYSTEM AND METHOD

(76) Inventors: Meng He, New York, NY (US); William L. Marino, New York, NY (US)

( * ) Notice: Subject to any disclaimer, the term of this patent is extended or adjusted under 35 U.S.C. 154(b) by 480 days.

(21) Appl. No.: 13/600,380

(22) Filed: Aug. 31, 2012

(65) Prior Publication Data

US 2014/0067099 A1    Mar. 6, 2014

(51) Int. Cl.
*G06F 17/00*    (2006.01)
*H04M 1/725*    (2006.01)

(52) U.S. Cl.
CPC ...... *H04M 1/72547* (2013.01); *H04M 2250/68* (2013.01)

(58) Field of Classification Search
CPC ............. G11B 15/087; G11B 15/1858; G11B 20/10527
See application file for complete search history.

(56) References Cited

U.S. PATENT DOCUMENTS

| 6,400,652 | B1 * | 6/2002 | Goldberg et al. | 369/7 |
| 6,671,567 | B1 * | 12/2003 | Dwyer et al. | 700/94 |
| 2005/0010635 | A1 * | 1/2005 | Schwesig et al. | 709/203 |
| 2005/0076058 | A1 * | 4/2005 | Schwesig et al. | 707/104.1 |
| 2007/0178934 | A1 * | 8/2007 | Sun | 455/550.1 |
| 2008/0103906 | A1 * | 5/2008 | Singh | 705/14 |
| 2009/0164429 | A1 * | 6/2009 | Svendsen et al. | 707/3 |
| 2009/0172129 | A1 * | 7/2009 | Singh et al. | 709/217 |
| 2010/0251137 | A1 * | 9/2010 | Qureshi | 715/752 |
| 2011/0213657 | A1 * | 9/2011 | O'Malley et al. | 705/14.49 |
| 2011/0270836 | A1 * | 11/2011 | Yang et al. | 707/737 |
| 2012/0253493 | A1 * | 10/2012 | Andrews | 700/94 |
| 2013/0216065 | A1 * | 8/2013 | Nguyen | 381/94.1 |

* cited by examiner

*Primary Examiner* — Andrew C Flanders
(74) *Attorney, Agent, or Firm* — Frank Marino

(57) ABSTRACT

An electronic device such as a smart phone, in combination with an application program residing at least partially therein and run at least partially thereby effectively enables selective retroactive recording to capture already-passed audible events when an audible trigger is recognized. When used in conjunction with an internet-based social media network or an interested contact list, audible events that meet certain pre-determined criteria may be automatically shared.

5 Claims, 1 Drawing Sheet

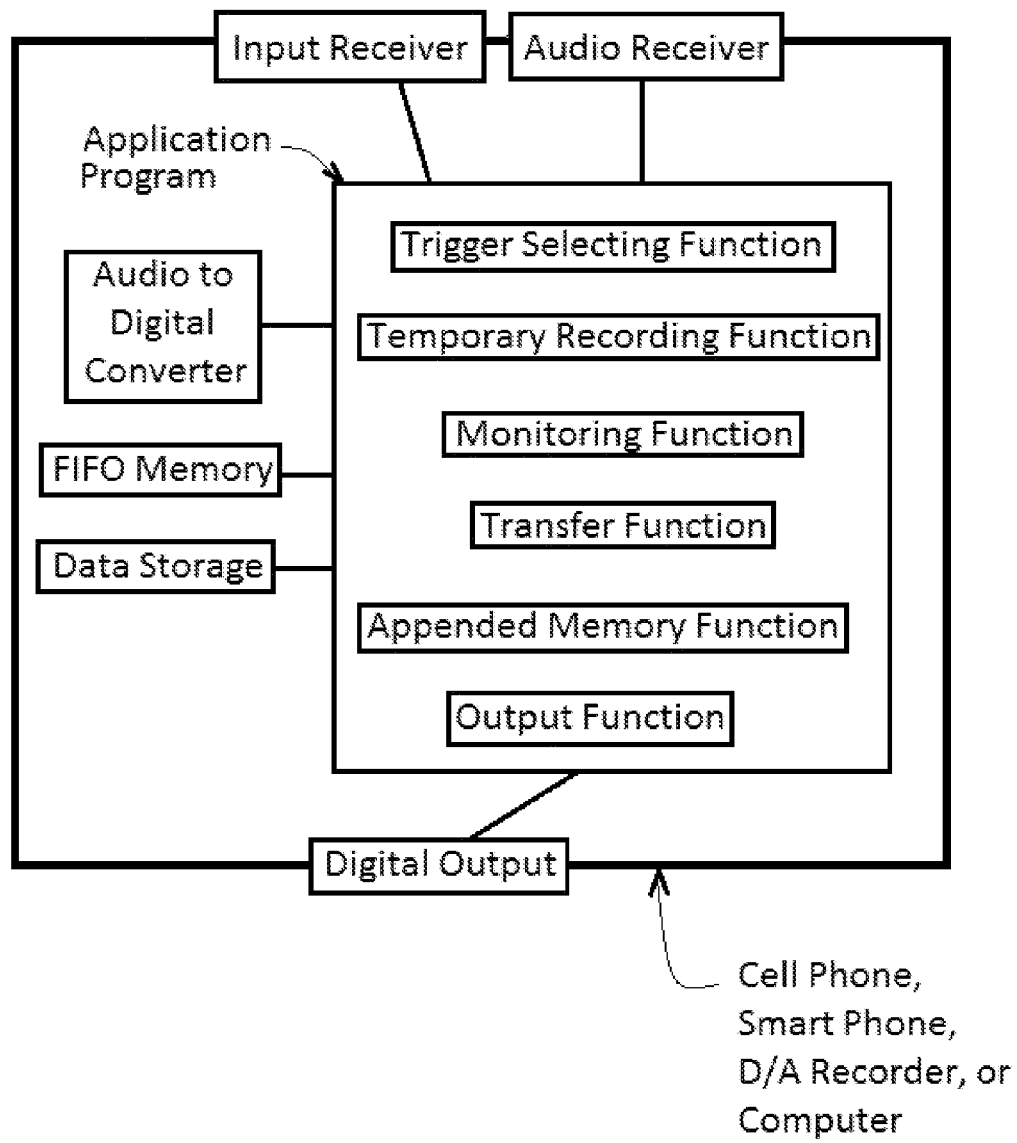

RECORDING SYSTEM AND METHOD

FIELD OF THE INVENTION

This invention relates to the selective recording and sharing of conversations and audible events. More specifically, the invention relates to the spontaneous, automatic, and retroactive recording, editing, storing, and sharing of spontaneous day-to-day conversations and situational events.

BACKGROUND

There is an ever-increasing popularity of social media web sites/applications and the sharing of situational happenings there-through. There is an ever-increasing need to enhance and simplify such sharing. There is an ever-increasing desire to keep and memorialize daily happenings and to enhance and simplify such keeping and memorializing. There is an ongoing need to improve the capturing, storing, and sharing of day-to-day conversations, quotations, and audible events. And there is a need to enable the retroactive capturing, storing, and sharing of day-to-day conversations, quotes, wisdom, jokes, and other audible events. Attending to such needs and desires are objects of the present invention. Other needs and objects will become apparent upon a reading of the following disclosure.

SUMMARY OF THE INVENTION

The present invention may be embodied in a website and/or an application for use with a record-enabled computer and/or mobile device (such as a cell phone, smart phone or tablet computer), or in a dedicated electronic device, that enables the retroactive capturing, editing, saving, and sharing of noteworthy statements, exchanges, and other audible events that may occur during conversations, parties, meetings, speeches, and other parts of daily life.

The invention may be practiced by and/or embodied in a combination of an electronic device and an application program residing at least partially therein and run at least partially thereby. The electronic device may be from the group including a cell phone, a smart phone, a digital audio recorder, and a computer, and may include; an input receiver for enabling selection of application program functions, an audio receiver, an audio to digital converter, a first-in-first-out digital memory, a data storage, and a digital output.

The application program may include a trigger selecting function by which an audible trigger is user-selected via the input receiver. The application program may include a temporary recording function by which an audio signal is continuously received by the audio receiver, converted to a primary digital record by the audio to digital converter, and stored into the first-in-first-out ("FIFO") memory. The temporary recording function may have a first predetermined time period after which the receiving, converting and storing are performed in a first-in-first-out loop having a length equal to the first predetermined time period.

The application program may include a monitoring function through which one of the received audio signal and the converted digital record is monitored in real time for a first occurrence of the user-selected audible trigger in the audio signal. The application program may include a transfer function through which the contents of the first-in-first-out memory are transferred to the data storage upon recognition of an occurrence of the user-selected audible trigger by the monitoring function. The application program may include an appended memory function through which the audio signal is further received by the audio receiver, converted to a secondary digital record by the audio to digital converter, and appended to the primary digital record in the data storage for a secondary predetermined time period after the first occurrence to create an extended digital record. And the application program may include an output function through which the extended digital record is outputted via the digital output.

The primary predetermined time period may be user-selectable through the input receiver. The second predetermined time period may be user-selectable through the input receiver. The trigger selecting function may include a library of selectable audio triggers. The trigger selecting function may include a trigger inputter for receiving user-inputted triggers. The extended digital record may be presented to a user as a text file which contains the trigger on a highlighted format.

The trigger inputter may be adapted to receive the user-inputted triggers via the audio receiver. The application program may further include an editing function for editing the extended digital record.

The combination may be further combined with a computer, wherein the application program additionally resides at least partially therein and is run at least partially thereby, and wherein the computer receives the extended digital record from the digital output. The editor may reside in the computer. The computer may receive the extended digital record from the output by wireless transmission.

The input receiver may enable user creation of a distribution list and the application program may further include a distribution function enabling distribution of the extended digital record to members of the distribution list. The computer may run the distribution function. The distribution list may reside in the computer. The computer may distribute the extended record via an Internet-based social media network. The distribution list may reside in the Internet-based social media network. The trigger selecting function may enable triggers to be inputted from an external network.

The library may comprise a list including at least one of words, phrases and sounds and/or representations of distinctive audible events from the group including laughter, applause, a specific combination of musical notes, a car accident sound, and an increase in detected volume. The user-selected trigger may be a combination of a plurality of items from the library. The user-selected trigger may be a combination of one or more items from the library with one or more user-inputted triggers.

The monitoring function may further cause the one of the received audio signal and the converted digital record to be further monitored in real time for a tertiary predetermined time period for a further occurrence after the first occurrence of the user-selected trigger during the further receiving, converting, and appending by the appended memory function, and the appended memory function may further create a tertiary digital record there-from, and append the tertiary digital record to the primary and secondary digital records in the data storage to create the extended digital record. The transfer function may include a bypasser wherein the contents of the first-in-first-out memory are transferred to the data storage upon a non-trigger based user command or input.

The invention may alternatively be practiced by and/or embodied in a combination of an electronic device and an application program residing at least partially therein and run at least partially thereby, as stated above except in which the trigger is preprogrammed rather than user-selectable.

Further aspects of the invention will be better understood and appreciated upon perusal of the following detailed description of exemplary embodiment of the invention.

DESCRIPTION OF THE DRAWING

FIG. 1 is a block diagram according to an exemplary embodiment of the invention.

DETAILED DESCRIPTION

In one exemplary embodiment of the invention, an application program within a smart phone enables the loading, by voice or manual input, of one or more triggers ("Triggers"). The program allows that, according to the user's selection, such Triggers may, for example, be topic-driven keywords aimed at capturing discussion of certain subjects (like "Rock Climbing" or "Home Brewing"). Or they may be the sort of phrases that indicate a noteworthy conversational event has just occurred (like "Hilarious!" or "Cool story, bro!"). Or, the keywords may be arbitrary, trademarked phrases (like "Quoteworthy!™") which a user can purposefully insert into conversations to create markers where none occur naturally.

Beyond keywords, the loadable Triggers available for selection by the user may be chosen from items that represent distinctive audible events, such as laughter, applause, musical notes, car accident sounds, or sharp rises in detected volume. A library of those Triggers most difficult to input manually, such as "laughter," is provided with the program for selection by users. Users may also select and download Triggers from an external network, such as those being used by other members of the application's user community or from an Internet-based social media network.

Users may also customize Triggers by applying additional rules, such as "laughter" followed by a specific phrase, or a certain phrase said by a specific person (determined by voice recognition), among other combinations. Users may select Triggers from the library, input them audibly, or combine library-provided Triggers and audibly inputted Triggers.

When in use, ambient sound is continuously recorded by the phone and stored as a "Temporary Recording" in the form of a digitized file that is inputted into a first-in first-out digital memory capable of holding a digitized audible record going back a selected time period; say, up to sixty minutes in selectable five minute increments (five, ten, fifteen, . . . , or sixty minutes). As additional bytes of recording are inputted, the oldest bytes that had been recorded back beyond the selected time period are dumped and replaced by the most recent bytes to create a continuous recorded loop.

Concurrently, the application monitors the incoming audible signal or stored data and compares (using sound and voice recognition software) it to the pre-selected Trigger(s). When a Trigger is recognized (or alternatively, when a Trigger-type event is created by a bypasser, such as by pressing a button on the device's user interface or by some other form of non-trigger based user command or input that bypasses the usual trigger monitoring) the entirety of the memory going back to the selected time period is transferred into digital storage, preferably into a secondary memory such as a random access memory or into an auxiliary location, such as a disc or server, for keeping, conversion into text, editing, and/or sharing.

Thus, the application allows for the retroactive recording of daily life by always maintaining the ability to go back in time and retrieve and keep audible events that occurred during a selected previous time period. Further, upon recognition of a Trigger, live recording may, if desired, continue as an "Appended Recording," appended to the retroactively-captured recording, to create an "Extended Recording" of any audible event that has been found to include a Trigger. For instance, recording may continue until a selected time period has passed without another occurrence of a Trigger.

The application further contains a set-up menu allowing the user to select numerous operational criteria including, among other things, the length of the "Temporary Recording" loop, whether or not the recording is continued after a Trigger is heard as an "Appended Recording," and if so, the length of the "Appended Recording", and whether the "Appended Recording" continues for a specific amount of time or until a certain amount of time has passed without further occurrences of a Trigger.

A typical scenario employing the invention is now explained;

With the phone turned on and the application activated, a Trigger is selected (or re-loaded, if it was selected as an ongoing Trigger during an earlier session). In this exemplary case the phrase "Rock Climbing" is set as the trigger by the user recording his recitation of the phrase into the device to create an audible signature. The goal in this exemplary case is thus to capture and record any conversations that the user has or overhears which are related to rock climbing, to share that conversation with other non-attending acquaintances, and with the general community.

The time period of five minutes is selected for "Temporary Recording." "Keep recording after Trigger" is selected to cause recording of the live discussion to continue and be appended to the prior five minutes after the phrase "Rock Climbing" is heard. "Five minutes after last occurrence" is selected for the period of "Appended Recording" so that the appended recording continues for five minutes after the last time the phrase "Rock Climbing" was heard. These settings will result in a digitized "Extended Recording" that starts five minutes before the phrase "Rock Climbing" is first heard and ends five minutes after it is last heard (even if the last time it is heard is the first utterance).

The recording is then activated, and the program begins continuous conversion of ambient conversation into a digitized data file that is stored in the short-term FIFO memory. In this exemplary case, because a five-minute time period was selected for "Temporary Recording", that the conversation of up to five minutes is held in the short-term memory at any given time.

The application program continuously monitors the ambient conversation, listening for the phrase "Rock Climbing", by comparing a signature of the conversation to the signature of the user-recorded phrase to determine whenever the conversation begins to involve rock climbing. Upon recognition that a Trigger has transpired, in this case, the selected phrase "Rock Climbing" has been uttered by anyone within the audible range of the device, the program causes the contents of the FIFO memory to be transferred to a larger and editable second memory and simultaneously causes the continuing ambient audible events to be recorded and appended to the record within the second memory until five minutes have passed without further utterance of the phrase "Rock Climbing". In this case, the application create an "Extended Recording" that is at least ten minutes long, starting five minutes before "Rock Climbing" was first uttered and ending five minutes after it was last uttered.

Upon completion of the Extended Recording, a digitized form of the recording's raw audio file is saved to a chronological list of recordings on the device's random access memory ("RAM"). The file could alternatively be saved into some other data storage associated with the user's application account, such as a flash drive, a server, a remote memory, etc. Concurrently, it is transcribed into text through voice recognition software. Once the transcription is complete, the text transcription (the "Extended Text") is also saved to the chronological list of recordings in the device's RAM as an "Extended Text" text file associated to the Extended Recording audio file from which it was extracted.

Upon the saving and transcription of the Extended Recording and Extended Text files, the user is alerted with a pop-up window, sound alarm, or similar alert that tells him a Trigger has been realized and presents him with an excerpt of the Extended Text transcription of the Extended Recording which contains the trigger, preferably in bold text or in some other highlighted format. The user may ignore this alert (in which case the recording can be accessed later in the user account's chronological list) or click through to access a menu giving the user the opportunity to interact with the Extended Recording and its Extended Text transcription in the following ways:

a) To play back the Extended Recording and, if so desired, bifurcate, truncate and/or apply filters (such as "radio static" or "laugh track") to it. If the recording is altered thusly, the new version (the "Edited Recording") will be saved as a new file replacing the original Extended Recording (which can be moved to the device's RAM or to the online storage space associated with the user account) on the chronological list of recordings in the device's RAM and/or in the online storage space associated with the user account.

b) To read and then, if so desired, edit or truncate the Extended Text transcription of the Extended Recording. If the Extended Text transcription is altered thusly, the new version (the "Edited Text") will be saved as a new file replacing the original Extended Text transcription (which can be moved to the device's RAM or to the online storage space associated with the user account) on the chronological list of recordings in the device's memory and/or in the online storage space associated with the user account.

c) To select, if so desired, a short slice of the Edited Text to serve as a handle for the Edited Recording and its appended Edited Text going forward.

d) To attribute, if so desired, the recording to a speaker to the Edited Recording (and its appended Edited Text transcription) through voice recognition, selection from a contact list (both native on the user's device or through social networks the user has linked), or manual input.

e) To create and/or append, if so desired, an image from the device's hard drive or the associated user account to the Edited Recording and its appended Edited Text transcription as a secondary handle.

f) To attach, if so desired, GPS coordinates, tagging information, or a named location to the Edited Recording and its appended Edited Text transcription through input from the device's GPS function or through input from location-tracking applications such as Foursquare.

g) To communicate, share, and/or publish, if so desired, the Edited Recording and its appended Edited Text transcription by broadcasting the text/image/location/speaker handle as a hyperlink linked to the Edited Recording and its Edited Text across social networks like Facebook, Google+, Twitter, Tumblr, Foursquare and the application's own internal sharing network, by email, and RSS feeds.

As previously mentioned, during the "Appended Recording" period, the application may or may not continue to create a temporary record of the ambient audible event, so as to capture other separate Triggers. In this case, the user had selected to enable "Temporary Recording" during "Appended Recording," and selected to input other Triggers.

So the program continues to monitor the conversation for the other Triggers. While "Rock Climbing" is still recognized as a Trigger during the "Appended Recording" period for the first file being created, a second file will be created in the same manner for the second Trigger if heard during the continuing recording.

For instance, the user may have set "Election" as a Trigger, and may have selected to simultaneously be listening for "Election" while listening for "Rock Climbing". If "Election" is heard before "Rock Climbing", or during the Appended Recording after "Rock Climbing" was first heard, a second file surround that utterance of "Election" will be created and treated as desired for potential editing, saving, and forwarding to his contacts.

The application also keeps a detailed archive of statistics, including the number of times a word, phrase, or Trigger is detected (regardless if the Appended Recording is saved), trends on the time of day these are detected, the people they speak with the most, their history of usage (total hours recorded or shared), and other interesting figures. The full breadth of data collected by the application is saved, although not all will be visible or available to the user to view.

Obviously, many modifications and variations of the present invention are possible in light of the above teachings. It is to be understood, therefore, that the invention can be practiced otherwise than as specifically described. With this in mind, the claims that follow will define the scope of protection to be afforded the invention, and those claims shall be deemed to include equivalent constructions insofar as they do not depart from the spirit and scope of the present invention. Certain of these claims may express certain elements as a means for performing a specific function, at times without the recital of structure or material. As the law demands, any such claims shall be construed to cover not only the corresponding structure and material expressly described in the specification but also equivalents thereof.

FIG. 1 is a block diagram according to an exemplary embodiment of the invention.

We claim:

1. In combination, an electronic device and an application program residing at least partially therein and run at least partially thereby:

the electronic device being from the group including a cell phone, a smart phone, a digital audio recorder, and a computer, and comprising:
an input receiver for enabling selection of application program functions;
an audio receiver;
an audio to digital converter;
a first-in-first-out digital memory;
a data storage; and
a digital output;
the application program comprising:
a trigger selecting function by which an audible trigger is user-selected via the input receiver;
a temporary recording function by which an audio signal is continuously received by the audio receiver, converted to a primary digital record by the audio to digital converter, and stored into the first-in-first-out memory, the temporary recording function having a first predetermined time period after which the receiving, converting and storing are performed in a first-in-first-out loop having a length equal to the first predetermined time period;
a monitoring function through which one of the received audio signal and the converted digital record is monitored in real time for a first occurrence of the user-selected audible trigger in the audio signal;

a transfer function through which the contents of the first-in-first-out memory are transferred to the data storage upon recognition of an occurrence of the user-selected audible trigger by the monitoring function;

an appended memory function through which the audio signal is further received by the audio receiver, converted to a secondary digital record by the audio to digital converter, and appended to the primary digital record in the data storage for a secondary predetermined time period after the first occurrence to create an extended digital record; and an output function through which the extended digital record is output via the digital output; in which the primary predetermined time period is user-selectable through the input receiver;

the second predetermined time period is user-selectable through the input receiver;

the trigger selecting function includes a library of selectable audio triggers;

the trigger selecting function includes a trigger inputter for receiving user-inputted triggers;

the trigger inputter is adapted to receive the user-inputted triggers via the audio receiver; and wherein the extended digital record is presented to a user as a text file which contains the trigger on a highlighted format.

2. In combination, an electronic device and an application program residing at least partially therein and run at least partially thereby:

the electronic device being from the group including a cell phone, a smart phone, a digital audio recorder, and a computer, and comprising:

an input receiver for enabling selection of application program functions;

an audio receiver;

an audio to digital converter;

a first-in-first-out digital memory;

a data storage; and a digital output;

the application program comprising:

a trigger selecting function by which an audible trigger is user-selected via the input receiver;

a temporary recording function by which an audio signal is continuously received by the audio receiver, converted to a primary digital record by the audio to digital converter, and stored into the first-in-first-out memory, the temporary recording function having a first predetermined time period after which the receiving, converting and storing are performed in a first-in-first-out loop having a length equal to the first predetermined time period;

a monitoring function through which one of the received audio signal and the converted digital record is monitored in real time for a first occurrence of the user-selected audible trigger in the audio signal;

a transfer function through which the contents of the first-in-first-out memory are transferred to the data storage upon recognition of an occurrence of the user-selected audible trigger by the monitoring function;

an appended memory function through which the audio signal is further received by the audio receiver, converted to a secondary digital record by the audio to digital converter, and appended to the primary digital record in the data storage for a secondary predetermined time period after the first occurrence to create an extended digital record; and an output function through which the extended digital record is output via the digital output; in which the primary predetermined time period is user-selectable through the input receiver;

the second predetermined time period is user-selectable through the input receiver; and in which the monitoring function further causes the one of the received audio signal and the converted digital record to be further monitored in real time for a tertiary predetermined time period for a further occurrence after the first occurrence of the user-selected trigger during the further receiving, converting, and appending by the appended memory function, and the appended memory function further creates a tertiary digital record therefrom, and appends the tertiary digital record to the primary and secondary digital records in the data storage to create the extended digital record.

3. The combination of claim 2 wherein the extended digital record is presented to a user as a text file which contains the trigger on a highlighted format.

4. The combination of claim 3 in which the trigger selecting function enables triggers to be inputted from an external network.

5. In combination, an electronic device and an application program residing at least partially therein and run at least partially thereby:

the electronic device being from the group including a cell phone, a smart phone, a digital audio recorder, and a computer, and comprising:

an input receiver for enabling selection of application program functions;

an audio receiver;

an audio to digital converter;

a first-in-first-out digital memory;

a data storage; and a digital output;

the application program comprising:

a temporary recording function by which an audio signal is continuously received by the audio receiver, converted to a primary digital record by the audio to digital converter, and stored into the first-in-first-out memory, the temporary recording function having a first predetermined time period after which the receiving, converting and storing are performed in a first-in-first-out loop having a length equal to the first predetermined time period;

a monitoring function through which one of the received audio signal and the converted digital record is monitored in real time for a first occurrence of a pre-programmed audible trigger in the audio signal;

a transfer function through which the contents of the first-in-first-out memory are transferred to the data storage upon recognition of an occurrence of the pre-programmed audible trigger by the monitoring function;

an appended memory function through which the audio signal is further received by the audio receiver, converted to a secondary digital record by the audio to digital converter, and appended to the primary digital record in the data storage for a secondary predetermined time period after the first occurrence to create an extended digital record; and an output function through which the extended digital record is output via the digital output;

in which the monitoring function further causes the one of the received audio signal and the converted digital record to be further monitored in real time for a tertiary predetermined time period for a further occurrence after the first occurrence of the pre-programmed audible trigger during the further receiving, converting, and appending by the appended memory function, and the appended memory function further creates a tertiary digital record there-from, and appends the tertiary digital record to the primary and secondary digital records in the data storage to create the extended digital record.

* * * * *